J. L. HALL.
PROJECTOR CONTROLLER.
APPLICATION FILED DEC. 14, 1908.
996,331.
Patented June 27, 1911.
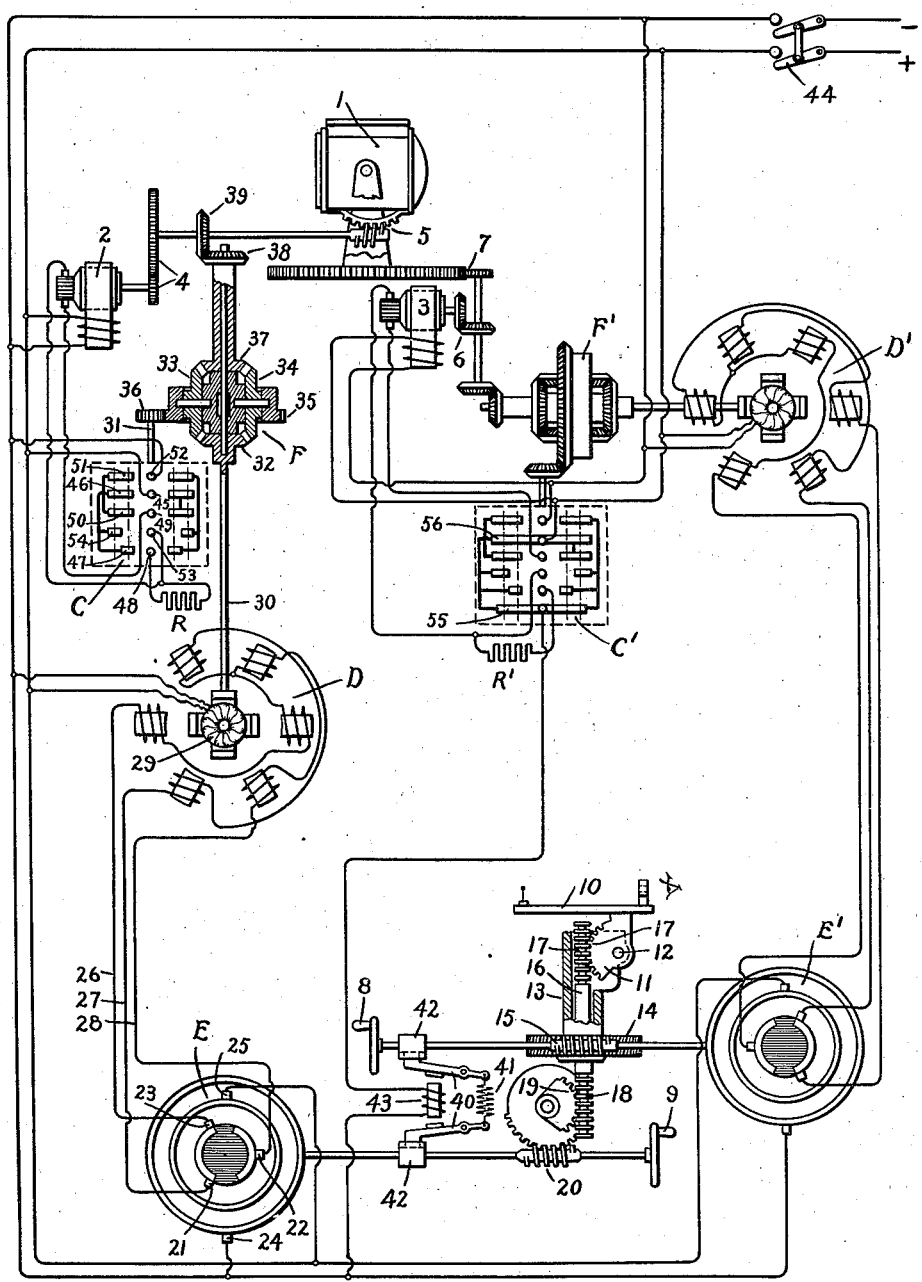
Witnesses
Irving E. Steers.
J. Ellis Glen.
Inventor.
John L. Hall
by Albert G. Davis
Atty

UNITED STATES PATENT OFFICE.

JOHN L. HALL, OF SCHENECTADY, NEW YORK, ASSIGNOR TO GENERAL ELECTRIC COMPANY, A CORPORATION OF NEW YORK.

PROJECTOR-CONTROLLER.

996,331.  Specification of Letters Patent.  Patented June 27, 1911.

Application filed December 14, 1908. Serial No. 467,474.

*To all whom it may concern:*

Be it known that I, JOHN L. HALL, a citizen of the United States, residing at Schenectady, county of Schenectady, State of New York, have invented certain new and useful Improvements in Projector-Controllers, of which the following is a specification.

This invention relates to the control of search light projectors and the like and has for its object the provision of means whereby devices of this character may be controlled from a remote point in a simple and efficient manner.

One of the objects of my invention is to produce a system of projector control in which a sight bar is used, the object being to produce a synchronous training system, in which the projector is always pointed in the same azimuth and at the same elevation as the sight bar, so that by moving the sight bar the projector beam is always moved correspondingly. In other words, the object is to produce a system of projector control in which the projector beam will always follow the line of sight.

Another object of my invention is to provide means for locking the controller handle when the current goes off, or when the handle is turned beyond a predetermined speed limit.

Other objects of my invention will appear in the course of the following specification, in which I have shown my invention embodied in concrete form for the purpose of illustration.

Referring to the drawings, 1 represents a device, the movement of which is to be controlled. I have shown this device as a search light projector, although it is evident that my invention is not limited to this particular use. This projector is arranged to be trained in a vertical plane or in "altitude" by the motor 2 and in a horizontal plane or in "azimuth" by the motor 3. The motor 2 trains in altitude from the spur gearing 4 and worm gearing 5 on the projector; the motor 3 trains in azimuth through the bevel gearing 6 and the spur 7, which rotates the turn table upon which the projector is mounted. The particular arrangement of motors and the gearing between these motors and the projector form no part of my invention. The arrangement shown in my previous Patent No. 739,599 can be used to advantage in this connection. The motors 2 and 3 rotate in either direction depending on the direction of current through the armature and have separately excited fields. The armature circuit of the motor 2 is controlled by the drum controller C, while the motor 3 is similarly controlled by the controller C', these controllers being in turn operated by the movable parts of the synchronous motors D and D'. These synchronous motors which act as pilot motors are controlled by hand wheels 8 and 9 in the hands of the operator and in turn control the sight bar 10 which may be of any suitable construction and provided, if desired, with a telescope or other arrangement for sighting. This sight bar is mounted upon a segmental rack 11 pivoted at 12 to the sleeve 13 forming the hub of worm wheel 14. The hand wheel 8 operates the worm 15 which drives the worm wheel 14 and in turn rotates the sight bar 10. Shaft 16 provided with teeth at 17 and 18 passes through sleeve 13, teeth 17 engaging teeth on the rack 11 while teeth 18 engage teeth on the segmental rack 19. A worm 20 driven by the hand wheel 9 and the worm wheel coöperating therewith rotate the segmental rack 19 which moves the shaft 16 up and down to train the sight bar in a vertical plane. The shafts upon which the hand wheels 8 and 9 are mounted likewise operate the communicating devices E and E' for controlling the synchronous motors D and D'.

The particular construction of the synchronous motor and the commutating devices form no part of my present invention, as they are fully described in my previous Patent 706,554, granted Aug. 12, 1902. Briefly stated, the commutating device consists of a cylinder upon which rests three contact fingers 21, 22 and 23 and two supply fingers 24 and 25. By this arrangement the direct current supply is converted into currents having three phase relation, which current is conducted through the conductors 26, 27 and 28 to the stator of the synchronous motor D. The rotor 29 of this motor is separately excited and arranged to drive the vertical shaft 30 which in turn drives the shaft 31 of the controller C. The arrangement is such that when the handle 9 is turned, it will rotate the cylinder of the commutating device a certain amount and rotor 29 of the motor D is rotated correspondingly, which in turn correspondingly rotates the drum C. This drum C controls the motor 2 which trains the projector in altitude. In my previous Patent 848,988, I have described means whereby the motor that operates to train the projector drives the controller backward, so that when the movement of the handle is stopped, the controller may be driven back to the starting point and the motor likewise stops. The present case differs from the arrangement disclosed in said patent in that a system of differential gearing is used. For bringing about this result, the shaft 30 is secured to the bevel gear 32 engaging the two bevel gears 33 and 34. These gears 33 and 34 are journaled on gear wheel 35 meshing with gear 36 on shaft 31. The gear 37 likewise meshes with the bevel gears 33 and 34, and is provided with an elongated sleeve or hub on which the bevel gear 38 is mounted. This gear meshes with bevel gear 39 which drives worm gearing 5 to move the projector in a vertical plane. The differential gearing which I have shown is well known and requires no further description.

The result which is accomplished is as follows: When the shaft 30 is rotated in response to the rotation of hand wheel 9, bevel gear 32 rotates and in turn drives gears 35 and 36 directly to rotate the controller drum C. This energizes the motor 2 which in turn trains the projector in altitude. As the gear 39 is rotated in the training of the projector, it drives the gears 38 and 37, which during the rotation of the shaft 30 have been stationary, and 33 and 34 which have been stationary on their respective shafts. The result is that the differential gears counteract the forward movement imparted by the shaft 30, so that the gears 35 and 36 remain stationary, so long as the hand wheel 9 is rotated. As soon as the hand wheel is stopped, the gear 36 is rotated backward to bring the controller to the off position and stop the motor. The same result is produced between the synchronous motor D' and the controller C' by the differential gearing F'.

In order to prevent the hand wheels from being operated when the current is off and to prevent the controller handle from being turned so fast that the training motor cannot keep up with the pilot motor, a locking device is provided, consisting of two pivoted pawls 40, having their adjacent ends connected by a spring 41, the opposite ends engaging slots in the sleeves 42 on the actuating shafts. These pawls 40 are controlled by magnet 43, which when energized, holds the pawls out of engagement with the slot in the sleeves so that the hand wheels can be turned. When, however, magnet 43 is deënergized, the pawls are spring pressed in contact with the sleeves and locks the handles. This magnet is controlled by the drum controller C' in a manner hereinafter described.

The arrangement of circuits and the mode of operation is as follows:—The line switch 44 being closed, the operator sights along the sight bar 10 and operates the handles 8 and 9 to shift the sight bar to any desired position. This sight bar 10 is shown for convenience in illustration, as being in the plane of the paper, whereas it should properly be turned at right angles to the paper. If for instance the handle 9 is turned, the sight bar 10 will be moved in a vertical plane and at the same time the controller C will be rotated through the commutating device E, motor D, and differential gearing F, so that the armature circuit of motor 2 will be closed as follows: from the positive main to contact 45, segment 46, segment 47, contact 48, resistance R, through the armature to contact 49, segments 50—51, contact 52, back to the negative main. This starts the motor 2 which moves the projector in a vertical plane, that is, it follows the movement of the sight bar 10. When the motor starts the drum C is driven backward by the differential gearing and the motor is maintained at a constant speed. If, however, the handle is moved faster, the drum C rotates faster and the resistance R will be cut out of the motor circuit by engagement of contact 53 with segment 54 so that the training may be done at a higher speed, if desired. If the hand wheel 8 is rotated, the sight bar 10 is turned on a horizontal plane and the controller C' is correspondingly rotated so as to energize the motor 3 through the commutating device E', motor D' and gearing F'. Resistance R' is at first in series with the motor armature, but may be eliminated and the motors speeded up if desired. The magnet 43 is energized through segments 55 and 56, the latter being slightly longer than the former. If the handle 8 is rotated too fast, so that the segment 55 passes off its contact, the circuit of magnet 43 will be broken and both operating handles locked. By this arrangement it will be seen that the sight bar may be shifted at will by the two hand wheels 8 and 9 and that the projector follows the sight bar so that a very accurate and speedy training of the projector is obtained.

While I have described my invention in connection with searchlight projectors, for which it is very well adapted, it should be understood that I do not limit my invention to this particular application, nor do I limit my invention to the particular arrangement of parts shown and described, since various modifications thereof will suggest themselves to those skilled in the art without departing from the spirit of my invention, the scope of which is set forth in the annexed claims.

What I claim as new and desire to secure by Letters Patent of the United States, is,—

1. The combination with a projector, of an electric motor for training the same, controlling means for said motor, a sight bar, and electrical means responsive to the movement of the sight bar for operating the controlling means.

2. The combination with a projector, of electric motors for training the same in altitude and azimuth, controlling means for said motors, a sight bar, and electrical means responsive to the movement of the sight bar for operating the controlling means.

3. The combination with a projector, of an electric motor for training the same, controlling means for said motor, electrical means responsive to the movement of the sight bar for operating the controlling means in one direction and connections whereby the motor operates the controlling means in the opposite direction.

4. The combination with a projector, of electric motors for training the same in altitude and azimuth, controlling means for said motors, a sight bar, electrical means responsive to the movement of the sight bar for operating the controlling means in one direction to start the motor, and connections whereby the motor operates the controlling means in the opposite direction to stop the motor.

5. The combination with a projector and an electric motor for training the same, of manual controlling mechanism for said motor, synchronizing means between said mechanism and said motor and an electromagnetic device for locking said controlling mechanism when it is operated beyond a predetermined speed.

6. The combination with a projector, of electric motors for training the same in altitude and azimuth, manual controlling mechanism for said motors, synchronizing means between said mechanism and said motors and a device for locking said controlling mechanism when it is operated beyond a predetermined speed.

7. The combination with a projector, of electric motors for training the same in altitude and azimuth, independent manual controlling mechanisms for said motors, synchronizing means between said mechanism and said motors, and an electromagnetic device for locking both of said controlling mechanisms when one of them is operated beyond a predetermined speed.

8. The combination with a projector and a sight bar, of independent manual controlling mechanisms for training the sight bar in altitude and azimuth respectively, means controlled by said manual mechanism for training the projector in synchronism with the sight bar, and an electromagnetic device for locking said manual mechanism when it is moved beyond a predetermined speed.

9. The combination with a projector and a sight bar, of a controlling handle arranged to shift said sight bar, an electric motor for operating said projector, a synchronizing device for controlling said motor and connections whereby said synchronizing device is actuated by said controlling handle.

10. The combination with a projector and a sight bar, of a controlling mechanism for shifting said sight bar in altitude and azimuth, electric motors for operating said projector, synchronizing devices for controlling said motors, and connections whereby said synchronizing devices are actuated by said controlling mechanism.

11. The combination with a projector and a sight bar, of independent controlling handles arranged to shift said sight bar, electric motors for operating said projector, synchronizing devices for controlling said motors and connections whereby each of said synchronizing devices is actuated by one of said controlling handles.

12. The combination with a projector and a sight bar, of a controlling mechanism for shifting said sight bar, electric motors for operating said projector, synchronizing devices for controlling said motors and connections whereby said synchronizing devices are actuated by said controlling mechanisms, an electromagnetic device for locking said controlling mechanism when the latter is shifted beyond a predetermined speed.

13. The combination with a projector and a sight bar, of independent controlling handles arranged to shift said sight bar, electric motors for operating said projector, synchronizing devices for controlling said motors, connections whereby each of said synchronizing devices is actuated by one of said controlling handles, and an electromagnetic device for locking said controlling handles when the sight bar is shifted beyond a predetermined speed.

14. The combination with a projector and a sight bar, of means for training the sight bar in altitude and azimuth, connections whereby the projector automatically follows the movements of the sight bar, and means for limiting the speed of movement of the sight bar.

15. The combination with a projector and a sight bar, of means for training the sight bar in altitude and azimuth, electrically controlled means for causing the projector to automatically follow the movements of the sight bar, and electromagnetic means for locking the sight bar against movement when it is operated beyond a predetermined speed.

In witness whereof, I have hereunto set my hand this 12th day of December, 1908.

JOHN L. HALL.

Witnesses:
BENJAMIN B. HULL,
HELEN ORFORD.